United States Patent
Naude

(10) Patent No.: US 6,835,153 B2
(45) Date of Patent: Dec. 28, 2004

(54) INFINITELY VARIABLE TRANSMISSION

(75) Inventor: Johannes Jacobus Naude, Randburg (ZA)

(73) Assignee: Varibox (PTY) Limited, Boksburg (ZA)

(*) Notice: Subject to any disclaimer, the term of this patent is extended or adjusted under 35 U.S.C. 154(b) by 0 days.

(21) Appl. No.: 10/344,575

(22) PCT Filed: Aug. 14, 2001

(86) PCT No.: PCT/ZA01/00120
§ 371 (c)(1), (2), (4) Date: Feb. 13, 2003

(87) PCT Pub. No.: WO02/14715
PCT Pub. Date: Feb. 21, 2002

(65) Prior Publication Data
US 2004/0025611 A1 Feb. 12, 2004

(30) Foreign Application Priority Data
Aug. 16, 2000 (ZA) .......................... 2000/4168

(51) Int. Cl.[7] .......................... F16H 37/02; F16D 27/10
(52) U.S. Cl. .................................. 475/207; 74/125.5
(58) Field of Search .............................. 475/207, 209, 475/214–217; 74/112, 116, 125.5

(56) References Cited

U.S. PATENT DOCUMENTS

| | | | |
|---|---|---|---|
| 1,916,283 A | | 7/1933 | Marcel |
| 2,935,596 A | * | 5/1960 | Thompson ................ 219/101 |
| 3,114,273 A | | 12/1963 | Boggs |
| 5,243,868 A | * | 9/1993 | Schonberger ............... 74/112 |
| 6,155,951 A | * | 12/2000 | Kuhn et al. ................. 475/207 |

FOREIGN PATENT DOCUMENTS

| | | |
|---|---|---|
| FR | 916 850 | 1/1947 |
| FR | 1 071 870 | 9/1954 |
| WO | 82/02233 | 7/1982 |
| WO | 89/11604 | 11/1989 |
| WO | 90/01648 | 2/1990 |
| WO | 91/18225 | 11/1991 |
| WO | 94/11652 | 5/1994 |
| WO | 00/23729 | 4/2000 |

* cited by examiner

Primary Examiner—Roger Pang
(74) Attorney, Agent, or Firm—Young & Thompson

(57) ABSTRACT

An infinitely variable transmission comprising an angular velocity input member (12), an angular velocity output member (14), two parallel stages (18, 20) of cyclic angular velocity generating devices (24, 30), a drive arrangement (16) for applying angular velocity from the input member (12) to each of the angular velocity generating devices (24, 30), extraction devices (26, 32) which are each driven by a cyclic angular velocity generating device (24, 30) in each of the two stages (18, 20) means for varying the amplitude of the cyclic angular velocity produced by at least one of the stages (18, 20) and an arrangement (28, 34, 22) for summing and combining the pulsating angular velocity outputs from the extraction devices (26, 32).

17 Claims, 9 Drawing Sheets

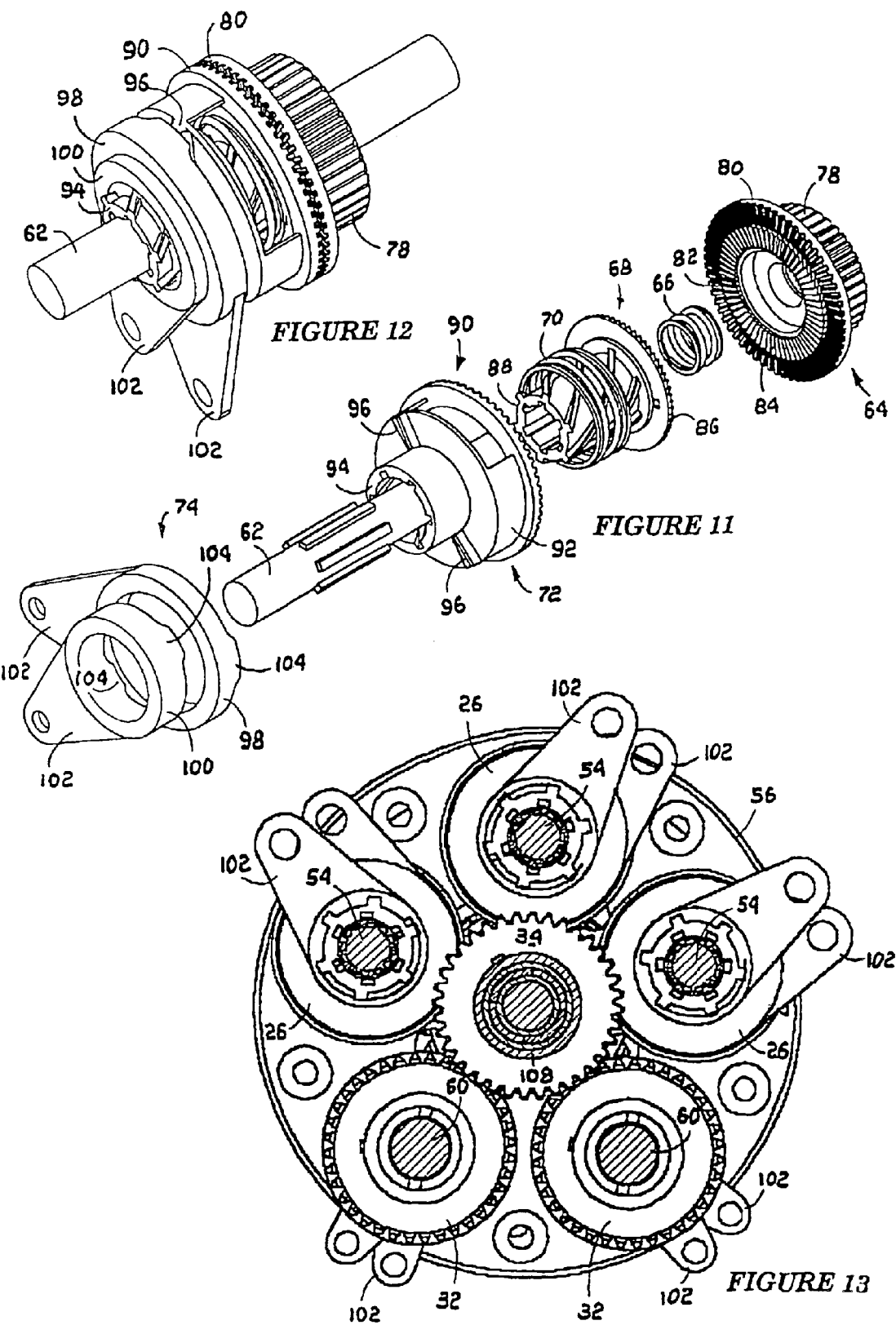

INFINITELY VARIABLE TRANSMISSION

FIELD OF THE INVENTION

This invention relate to a stepless infinitely variable transmission (IVT) machine which is capable of producing an output angular velocity which is continuously variable over a predetermined range of angular velocities relative to the input angular velocity.

BACKGROUND TO THE INVENTION

Many IVT machines have over the years been proposed and developed in attempts to produce, from a constant input angular velocity, an acceptable linear continuously variable output angular velocity and torque.

The basic approach to these machines has been initially to apply a single input angular velocity to a number of parallel stages of the machines which by means of cams, slotted plates, linkages, off-centred sun gears, non-circular gears, orbital devices and so on produce pulsed or cycled angular velocities (angular acceleration and deceleration cycles) which are appropriately phased to the input angular velocity. The pulsed or cycled angular velocities from the machine input stages are then used to drive selective extraction devices, such as overrunning or sprag clutches and/or differentials which extract the maximum portions of the driven cycles of the parallel stages to provide modulated angular velocity outputs. These outputs are then recombined in an output stage of the machine to provide the output angular velocity of the machine. Examples of the these machines are disclosed in the specifications of the following publications: WO 82/02233, WO 89/11604, WO 90/01648, WO 91/18225 and WO 94/11652.

Common problems which are typically associated with IVT machines of the prior art are that:

they are capable of transmitting power in only one direction of rotation, which cannot be reversed, their cyclic angular velocity generating devices generate, in each parallel stage of the machine, a full cycle of a periodic motion on each revolution of their input shafts with their single drive direction overrunning clutch extraction devices being capable of clipping only the single maximum velocity peak from each cycle. The consequence of this is that the angular velocity output arrangements of the machines, such as planetary gear systems, are largely incapable of fully modulating the coarsely rippled output of the extraction devices to an acceptable purely or nearly so theoretically constant linear output velocity, and the majority of the cyclic angular velocity generating devices which are employed in the IVT machines and which include oscillating components such as the slotted plates, linkages which drive or are driven by off-centre gears, cams and the like suffer from balancing and other vibration problems which are principally caused mainly by shock loads generated by the direction changing mechanisms.

SUMMARY OF THE INVENTION

A method of operating an IVT machine according to the invention includes the steps of rotating an angular velocity input member of the machine at a constant angular velocity applying the input angular velocity in a fixed ratio to two parallel stages of the machine which each include a plurality of cyclic angular velocity generating devices which in each stage are rotated in a common direction, generating a cyclic angular velocity by means of each cyclic angular velocity generating device to produce the same number of angular velocity output cycles from each stage for each revolution of the angular velocity input member with the cyclic angular velocity output of each stage being evenly phased relatively to the other, inverting the cyclic angular velocity outputs of at least one stage relatively to the other, adjusting the amplitudes of the cyclic output angular velocity outputs of the cyclic angular velocity devices in at least one of the stages [18,20] to correspond in amplitude and shape to those of the other stage as the angular velocity ratio of the machine is changed, applying each of the cyclic angular velocities of the cyclic angular velocity generating devices in each stage to an extraction device causing each of the extraction devices to extract the absolute global maximum or minimum angular velocity peak pulses from each of the cyclic angular velocities, summing and combining the pulsed outputs from each stage applying the relatively inverted combined individual pulsed outputs from each stage individually to a planetary gear arrangement cancelling the inverted, equal amplitude, evenly phased pulsed outputs from each stage in the planetary gear arrangement and applying a single non pulsing output angular velocity from the planetary gear arrangement to an output member of the machine.

The cyclic angular velocity generating devices may each include at least two shafts which are coupled by at least one universal joint and the method includes the steps of adjusting the amplitude of the cyclic angular velocity of each cyclic angular velocity generating device by moving one of the shafts relatively to the other to vary their angular dispositions relatively to each other.

An infinitely variable transmission according to the invention comprises an angular velocity input member, an angular velocity output member, two parallel stages of cyclic angular velocity generating devices, a drive arrangement for applying angular velocity from the input member to each of the angular velocity generating devices, extraction devices which are each driven by a cyclic angular velocity generating device in each of the two stages which extracts the absolute maximum angular velocity pulsations from the cyclic angular velocity output of the cyclic angular velocity generating device which drives it, means for varying the amplitude of the cyclic angular velocity produced by at least one of the stages, an arrangement for summing and combining the pulsating angular velocity outputs from the extraction devices and applying a single non-pulsating output angular velocity to the output member, characterised in that each of the cyclic angular velocity generating devices includes two shafts which are coupled to each other by at least one universal joint, the drive means includes a drive arrangement for driving each of the angular velocity generating devices in a first of the stages in a first direction of rotation and each of the angular velocity devices of the second stage in an opposite direction and in a fixed ratio of rotation relatively to the angular velocity generating devices of the first stage so that each stage produces the same number of angular velocity cycles per revolution of the input member and the amplitude varying means is an arrangement for angularly moving one of the shafts of each of the cyclic angular velocity generating devices relatively to the other in at least one stage to enable the amplitudes of the cyclic angular velocities generated by the cyclic angular velocity generating devices in that stage to be varied to correspond to the angular velocity amplitudes in the remaining stage.

The angular velocity generating stage may include at least three cyclic angular velocity generating devices and the angular velocity generating stage two cyclic angular velocity generating devices. Conveniently, the angular velocity generating devices in each stage are rotationally phased 60° apart with reference to the input member.

The universal joint sets of the stage 18 may be rotated by the drive means in a ratio of 1:1 relatively to and in the same direction of rotation as the input member and the universal joint sets of the stage are rotated in a ratio of 1:1.5 relatively to and in a direction opposite to the direction of rotation of the input member.

In a preferred form of the invention the angular velocity generating devices are each a universal joint set which includes a universal shaft which carries at each of its ends a universal joint with one of the universal joints being driven by the drive means with the other connected by a shaft to an extraction device. Preferably, the universal shaft of each universal joint set is telescopically variable in length. The yokes of the universal joints of the universal joint sets which are attached to the universal shaft are preferably fixed in each set at 90° to each other.

The components of the drive arrangement may be located between and on two circular plates and the components of the transmission are located in a cylindrical housing with the plates of the drive means fixed to the housing wall with the remainder of the components being at least partially rotatable about the housing axis to vary the output amplitudes of the cyclic angular velocities of the universal joint sets by varying the angular disposition of the universal shafts of the universal joint sets relatively to their universal joints.

The extraction devices may be rotatably mounted between two circular plates with the shafts of the universal joint sets passing slidably through the plates and the extraction devices between them. The plates may each be rotatably mounted coaxially in the housing on a guide track on the inner wall of the housing.

The extraction devices may each include a boss with which a shaft of a universal joint set is engaged, opposed clutch plates with one of the clutch plates being engaged with the boss and the other with an output gear with both clutch plates being movable relatively to each other in the axial direction of the shafts between a first position in which they are spaced from each other and a second position in which they are engaged with each other and means for causing movement of the clutch plates between their two positions of movement, in dependence on the angular position of rotation of the shafts with which they are engaged, twice during each revolution of the shafts and for adjustably varying the time period of engagement of the plates to cause their output gear to partially rotate twice during each cycle of rotation of the drive shafts and so to extract an output gear movement pulse from the global absolute maximum and minimum portions of each cycle of rotation of the drive shafts.

The clutch plate movement causing means, in one form of the invention, may be a double lobed cam arrangement and two cam followers which are carried by the extraction device boss and the extraction device includes biasing means biasing the cam followers onto the cam arrangement.

The cam arrangement conveniently includes two annular rings with one concentrically located within the other to be relatively rotatable about and clear of the shaft, two diametrically opposite raised cam lobes which extend over a predetermined limited portion of the circumferential length of and project outwardly from the annular face of each of the rings on a common side of the rings, and a control arm which projects radially outwardly from at least one of the rings for rotating the ring and the lobes on it from a position in which both lobes on the rings overlap and are in radial register to a position in which the two pairs of lobes partially overlap each other to increase the circumferential length of the composite lobes.

The clutch plates are dog-tooth clutch plates and the extraction devices may each include two synchronisation ring plates with plates each being associated with one of the clutch plates and each synchronisation plate includes a ring of radial teeth which face and mesh with those on the opposite synchronisation plate with the synchronisation plates being movable relatively to their associated clutch plates towards and away from the remaining synchronisation plate and means biasing the synchronisation plates away from the faces of the clutch plates so that when the clutch plates are moved towards each other the teeth on the synchronisation plates first engage each other and, if necessary, fractionally rotate relatively to the other to ensure a clean mesh of the dog-teeth on the clutch plates when brought into engagement.

In another form of the invention the clutch plates could be smooth faced metal plates and the extraction devices each include means for electrically magnetising at least one of the plates to cause the plates to become magnetically coupled, and electrical switch means which is synchronised with the shaft for switching electrical current to the clutch plate magnetising means twice for every revolution of the shaft for predetermined time periods during each revolution of the shaft. The clutch plate movement causing means may be an electrical device for moving at least one of the plates towards the other to become coupled and electrical switch means which is synchronised with the shaft for switching electrical current to the clutch plate moving means twice in predetermined time periods during each revolution of the shaft.

The cyclic angular velocity amplitude adjusting means may include a carrier which is engaged with the shafts of the universal joint sets with the carrier including a radially extending control pin and the housing wall a helical guide slot through which the pin projects to be movable from one end of the slot, at which the components of the universal joint sets are in axial alignment and the angular velocity of the universal joint sets is non-cyclic at the low end of the transmission ratio range, to the other end of the slot at which the carrier has rotated the plates to the maximum position of angular displacement of the universal shafts of the universal joint sets to achieve maximum cyclic angular velocity output amplitude at the high end of the transmission ratio range.

Preferably, the housing additionally includes a circumferential slot in its wall through which the ends of the cam arms of the extraction devices project and a suitable control arrangement on the outside of the housing for moving the control pin in its slot and causing concomitant movement of the cam arms to vary the amplitude of the pulsed output angular velocities of the extraction devices to compensate for cyclic angular velocity amplitude changes of the universal joints as the control pin is moved.

The summing arrangement for summing the pulsed outputs of the extraction devices of each of the cyclic angular velocity generating stages may include two gear arrangements which each combine the pulsed angular velocity outputs of the extraction devices of one of the stages to provide two inverted and evenly phased pulsed angular velocity outputs with the pulses in each output angular velocity having the same shape, amplitude. The summing arrangement may include a planetary gear arrangement which drives the infinitely variable transmission output member with the planetary gear arrangement having an e value of −1 to which the summing arrangement outputs are separately applied for the planetary gear arrangement to cancel the inverted summing arrangement output pulses and to generate and apply a variable non-pulsating linear output velocity to the output member.

BRIEF DESCRIPTION OF THE DRAWINGS

An embodiment of the invention is now described by way of example only with reference to the drawings in which:

FIG. 11 is an exploded perspective view of one of the angular velocity extraction devices as used in the machine of the invention, FIG. 12 is a perspective view from the rear of the assembled angular velocity extraction device of FIG. 11, FIG. 13 is an end elevation of the machine shown sectioned on the line 13—13 in FIG. 7.

DETAILED DESCRIPTION OF THE PREFERRED EMBODIMENT

Figure 1:
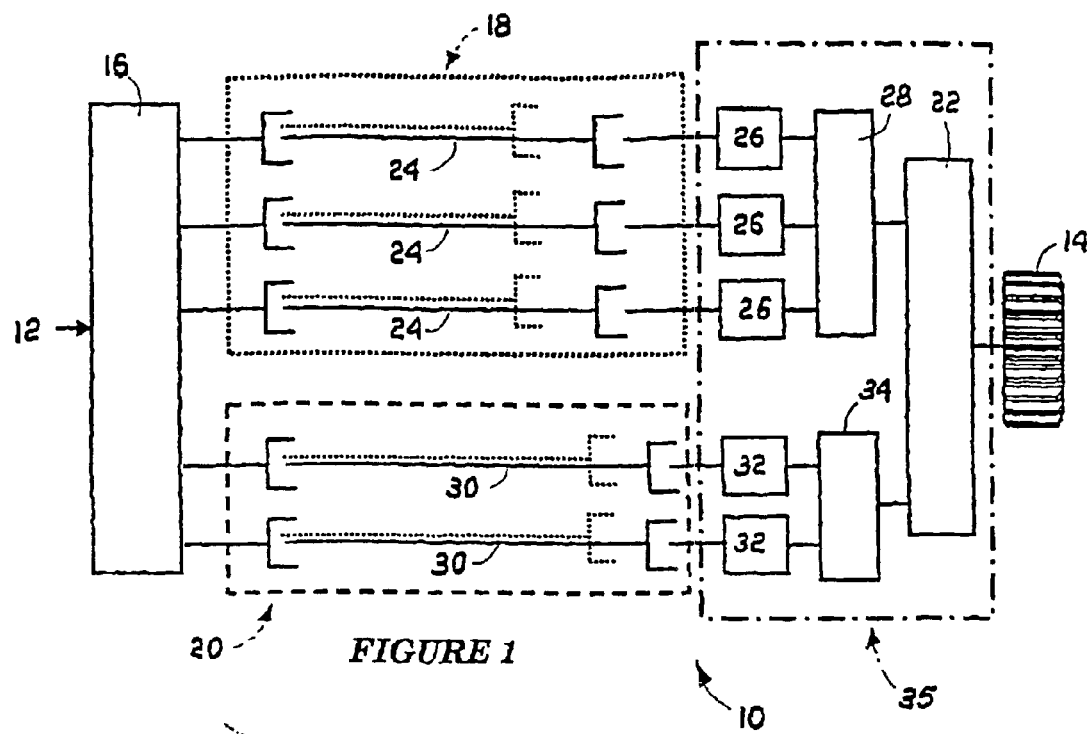
FIG. 1 is a block diagram of the IVT machine of the invention.

The block diagram of FIG. 1 shows the IVT machine 10 of the invention to consist of an angular velocity input shaft 12, an output gear 14, an angular velocity input divider 16, two parallel angular velocity transmission stages 18 and 20 and a planetary gear output arrangement 22 which drives the output gear 14.

The transmission stage 18 of the machine 10 acts in the machine as a variable gearbox and is a non-reference system which includes three universal joint sets 24 which are each driven by the input divider in a ratio of 1:1 to the angular velocity of the input shaft 12. Each of universal joint sets 24 drives a global minimum or maximum angular velocity extraction device 26 the pulsed outputs of which are combined in a summation gear arrangement 28.

The transmission stage 20 of the machine is employed as a reference system which includes a pair of universal joint sets 30 which are driven by the input divider 16 in a ratio of 1:1.5 to the angular velocity of the input shaft in a direction of rotation opposite to that of the universal joint sets 24, two global minimum or maximum angular velocity extraction devices 32 and a summation gear arrangement 34 which combines the pulsed outputs of the devices 32. The block 35 in FIG. 1 includes the angular velocity extraction devices 24 and 30, the summation arrangements and the planetary gear output arrangement 22 and is below referred to as the output unit of the machine.

The outputs of the summation arrangements 28 and 34 are recombined in the planetary gear arrangement 22 which drives the IVT output gear 14.

The transmission stages 18 and 20 of the machine include control means, which is described below, for simultaneously altering and equalising the amplitudes of the cyclic angular velocity outputs of the universal joint sets of both stages. Equalising the amplitudes of the extracted minimum or maximum of the two cyclic angular velocity stages results in a planetary gear non-pulsating angular velocity output from the planetary gear arrangement 22 that increases or reduces the variable gearbox ratio of the machine.

Figure 2:
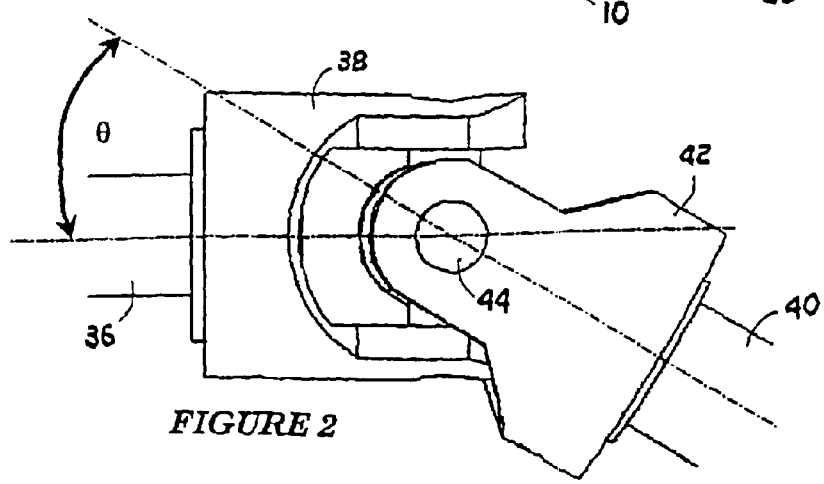
FIG. 2 is a side elevation of a conventional universal joint.

A universal joint, as illustrated in FIG. 2, has been selected, in this embodiment of the invention, as the angular velocity varying component of the machine principally because of its smooth and uninterrupted unidirectional rotation while producing the required cyclic angular velocity which is necessary for generating the non-cyclic infinitely variable angular velocity of the machine at its output within a required output angular velocity range.

Figure 3:
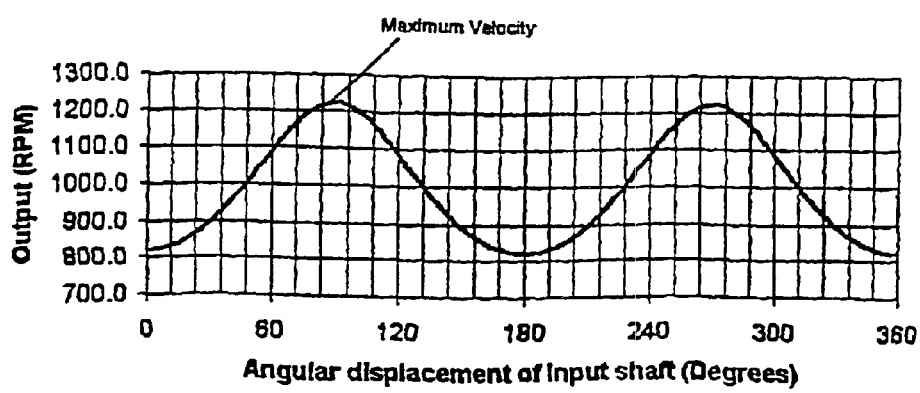
FIG. 3 is a graph illustrating the cyclic output angular velocity of the FIG. 2 single universal joint while being rotated.

The FIG. 2 universal joint is, as is conventional, composed of an input shaft 36 which is fixed to an input yoke 38, an output shaft 40 which carries an output yoke 42 and the usual cruciform connector 44 to which the input and output yokes are pivotally attached. In FIG. 2 the centre lines of the shafts 36 and 40 are shown at an angle θ of rotation equal to 30°. The graph of FIG. 3 illustrates the cyclic angular velocity of the output shaft 40 with a constant input angular velocity of 1000 rpm applied to the input shaft 36. The angular displacement θ of the shafts 36 and 40 determines the amplitude of the angular velocity of the output shaft 40 cyclic output. For example, with the axes of the shafts in register and the angle θ equal to 0° the output angular velocity amplitude is zero and the two shafts rotate at the same angular velocity. As the angle θ is increased the output of the shaft 40 becomes cyclic, as shown in FIG. 3, with the cyclic amplitude progressively rising through the illustrated range to a peak angular velocity of a little over 1200 rpm.

Figure 4:
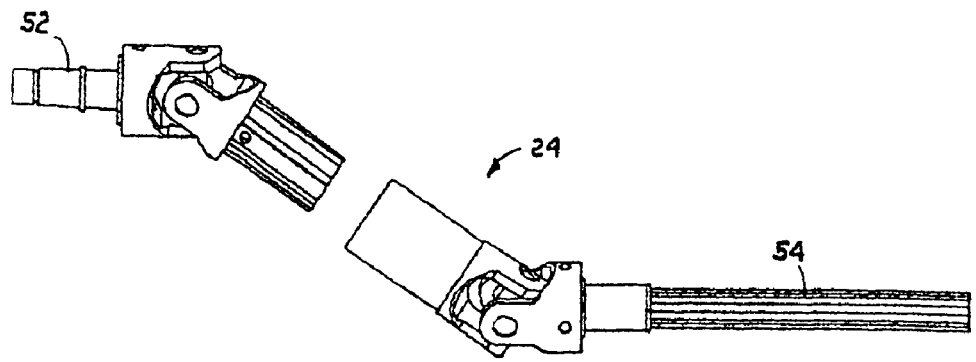
FIG. 4 is a side elevation of a non-reference universal joint set of the machine of the invention.
Figure 5:
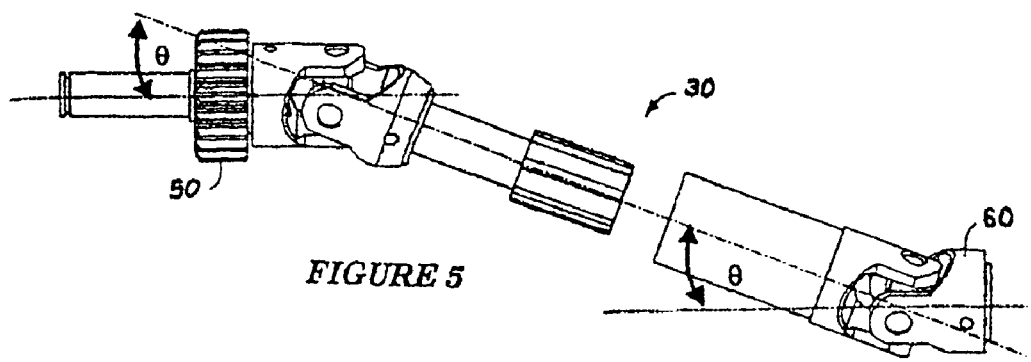
FIG. 5 is a side elevation of a reference universal joint set of the invention.

When two of the universal joints are coupled by a universal shaft and operate together, as is the case with all of the universal joint sets 24 and 30 of this invention, as illustrated in FIGS. 4 and 5, they are each capable of either eliminating or superimposing the separate cyclic effects of the two universal joints. To cancel the cyclic effect, the inner yokes of each of the universal joint sets in FIGS. 4 and 5 which are connected to the universal shaft are arranged to be in axial register with the shafts connected to the outer yokes with no angular displacement between their alignments. However, with the inner yokes set and fixed relatively to each other with a 90° displacement between them, as shown in FIGS. 4 and 5, the cyclic effect of the two yokes are superimposed with the combined peak angular velocity being double that of the single yoke amplitude illustrated in FIG. 3.

The IVT machine of the invention is shown in the remainder of the drawings of the machine to illustrate the location and arrangement of the various components, referred to with reference to FIG. 1, in the physical machine. The summation gear arrangements 28 and 34 are shown only in FIG. 8.

The machine input shaft 12, as is most clearly seen in FIG. 3, extends through the entire machine and, with the exception of the input divider 16 arrangement, serves only as the support spine of the machine about which the output stage 35 of the machine is merely rotatable on suitable bearings.

Figure 9:
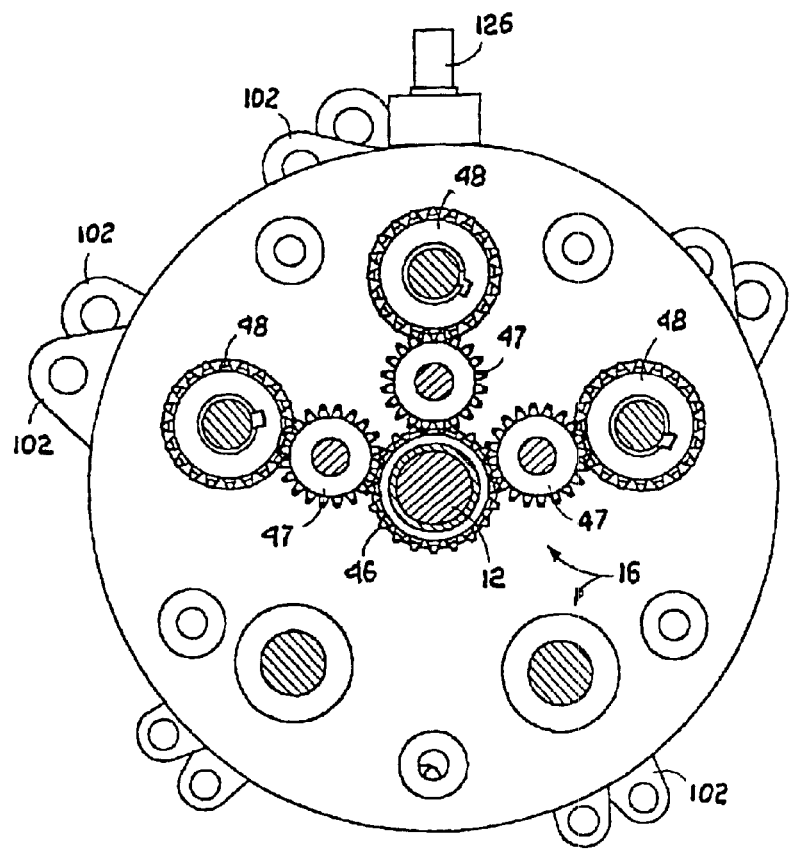
FIG. 9 is an end elevation of the FIG. 7 machine shown sectioned on the line 9—9 in FIG. 7.
Figure 10:
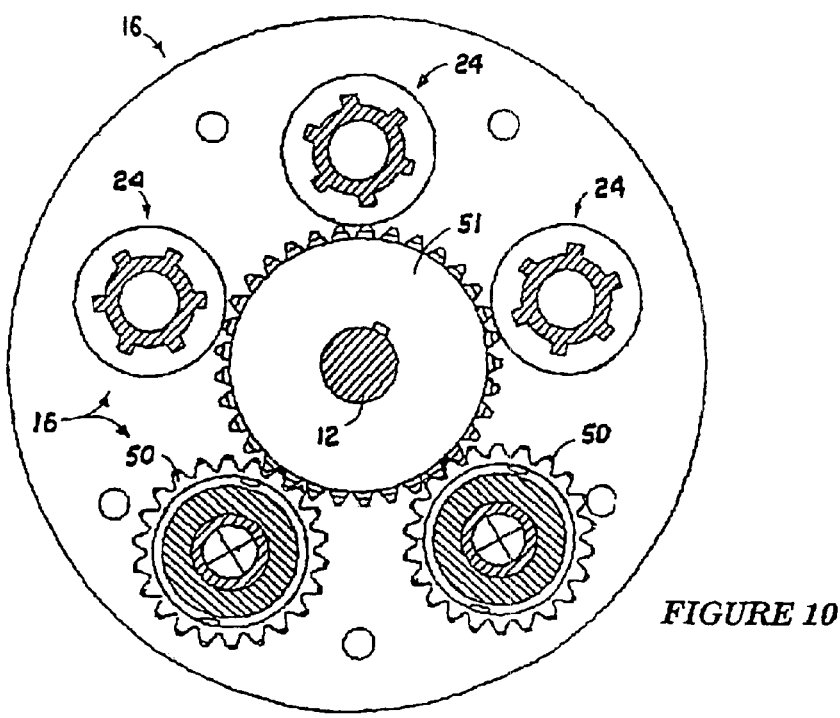
FIG. 10 is an end elevation of the machine shown sectioned on the line 10—10 in FIG. 7.

As shown in FIG. 9 the shaft 12 carries, in the angular velocity divider 16, a drive gear 46 which, by means of three idler gears 47, drives drive gears 48 which are attached to the drive shafts of the non-reference universal joint sets 24. Drive gears 50, for the universal joint sets 30 of the reference stage 20 of the machine are located, as shown in FIG. 10, on the opposite side of the forward input divider mounting plate with their drive shafts on which they are mounted being journaled for rotation, in the opposite direction to the direction of rotation of the gears 48 in FIG. 9, in both mounting plates of the input divider section of the machine. The gears 50 are driven by a gear 51 which is mounted on the shaft 12 and has a larger diameter than the non-reference stage drive gear 46.

The non-reference 24 and reference 30 universal joint sets of FIGS. 4 and 5 respectively each include a composite universal shaft, between two universal joints, which is made to be telescopically extensible in length on the illustrated sliding interengageable male and female splined formations.

The left hand outer universal joint yoke of the non-referenced set of FIG. 4 is attached to a drive shaft 52 to which, as mentioned above, an input divider 16 gear 48 is attached. The outer right hand universal joint yoke is attached to an elongated splined shaft 54 which, as seen in FIG. 8, passes slidably through an angular velocity extraction device 26 and two complementally splined guides in circular support plates 56 and 58 on either side of the five extraction devices of the machine.

Figure 8:
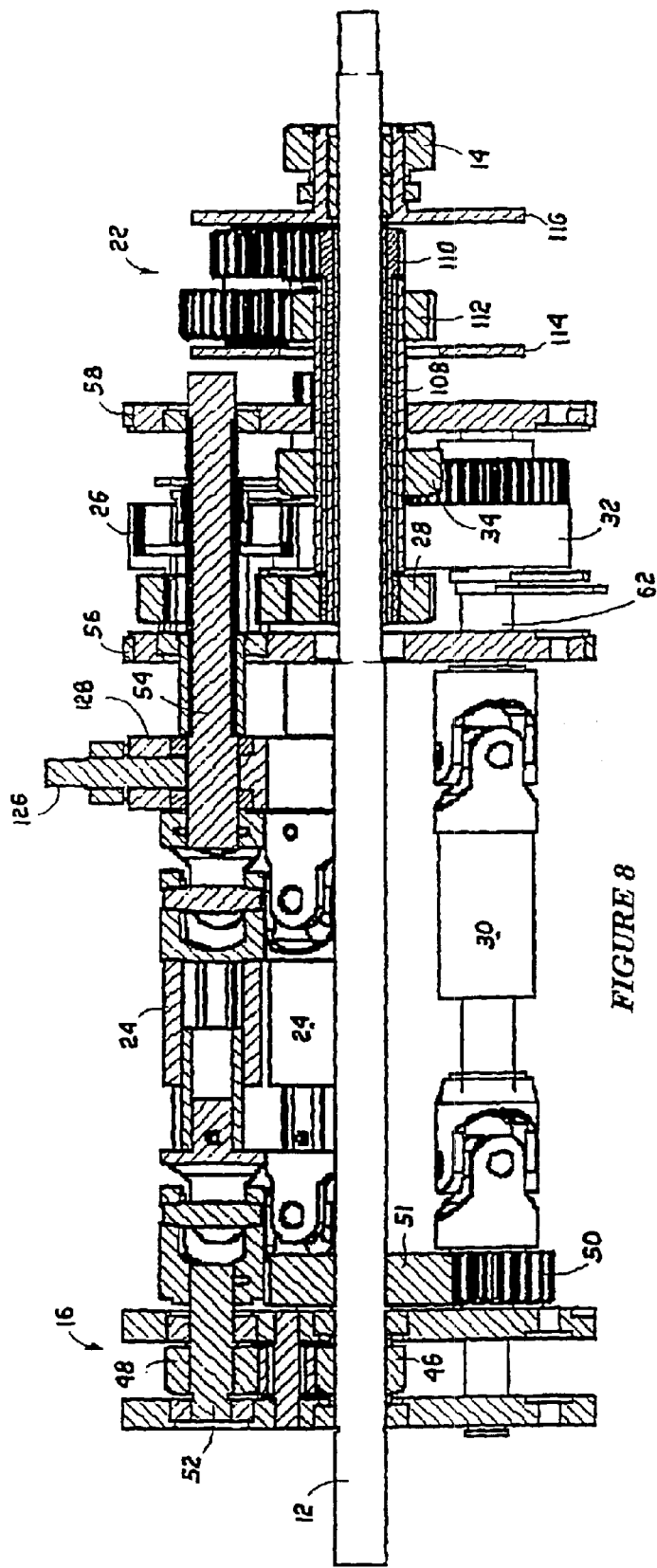
FIG. 8 is a sectional side elevation of the machine of FIG. 7.

The left hand outer universal joint yoke of the reference universal joint set of FIG. 5, carries a gear 50 while the right hand yoke 60 is fixed to a shaft 62 which drives an angular velocity extraction device 32 which is located between the two circular support plates 56 and 58, as shown in FIG. 8.

The angular velocity extraction devices 26 and 32, as used in this embodiment of the invention, are identical synchronisation clutches which are shown in FIGS. 11 and 12 to include an input shaft 62, an output unit 64, a compression spring 66, a synchronisation unit 68, a second coil spring 70, a coupling hub 72 and a coupling duration cam arrangement 74.

Figure 6:
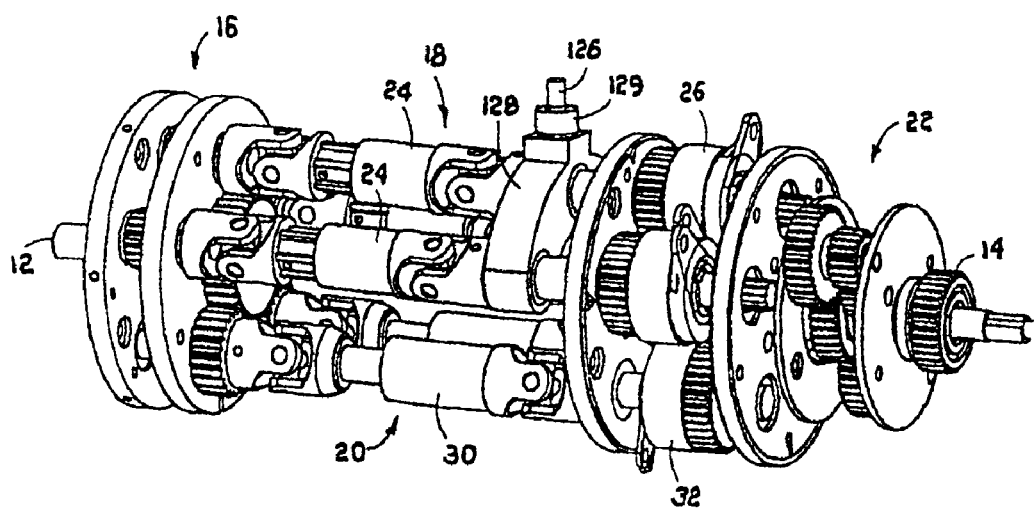
FIG. 6 is a perspective view of the physical IVT machine of FIG. 1 shown in its low ratio mode of operation.
Figure 7:
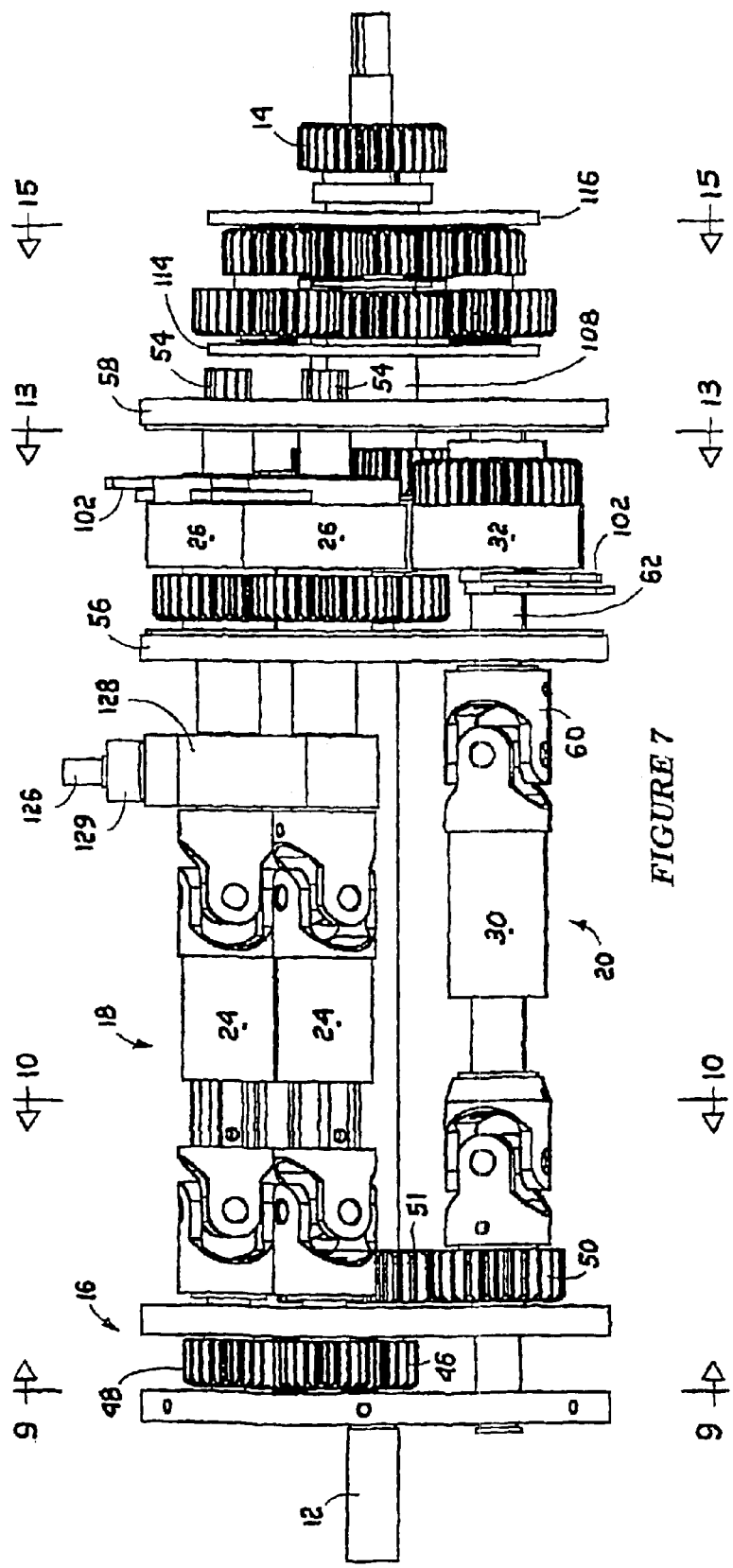
FIG. 7 is a side elevation of the machine as shown in FIG. 6.

The input shaft 62 is splined in its central zone, as shown in FIG. 11, and carries on its left hand end a universal joint outer yoke, as is shown in FIGS. 6 and 7. This partially splined shaft is used only with the two reference extraction devices 32 while the three extraction devices 26 are driven by the fully splined lengthened shafts 54 of the universal joint sets 24.

The output unit 64 includes an output gear 78 and an integral clutch plate 80. The clutch plate carries, as shown in FIG. 11, an outer ring 82 of dog clutch teeth and a radially inner synchronisation plate 84. The synchronisation plate carries, on its front face, a ring of serrated saw teeth and on its rear face guide means such as pins or the like, not shown, which are slidable in bores which are integral with the output unit housing to enable the plate to move, in the axial direction only of the output unit, between an outer position shown in the drawing to which it is biased by means of a coil spring which bears on its rear surface, and in which position its teeth are proud, in the axial direction of the output unit 64, of the outer ridge surfaces of the dog teeth on the ring 82 and an inner position in the output unit in which its teeth are situated behind the dog clutch teeth.

The spring 66, in the assembled unit is located over the forward end portion of the shaft 62 and acts between the rear face of the recess in the output unit 64 and the forward face of the clutch synchroniser unit 68.

The synchroniser unit 68 includes an annular ring plate 86 which has an outer diameter equal to that of the synchronisation plate 84 of the clutch plate 80 and carries on its front face a ring of serrated saw teeth which are complementally shaped to and with the same pitch as those of the ring 84 in the clutch plate 80. A bendix-like helically splined sleeve 88 is integral with and projects from the rear face of the plate 86 of the synchronisation unit 68. The sleeve bore is splined to receive the splines on the input shaft 62 to enable the unit 68 to be slidable on the shaft in its axial direction.

The bendix-type spring 70 is, in the assembled device, located over the spline sleeve 88 of the unit 68. The spring 70 has a greater compression resistance than that of the spring 66.

The coupling hub 72 includes a ring clutch plate 90 which carries on its front face radial dog tooth formations which are complemental to those on the outer ring 82 of the output unit 64. A cup-like housing 92 is integral with and projects coaxially rearwardly from the ring plate 90 and carries, on its rear face, a hub 94 the bore of which is helically splined for slidably receiving the helical splines on the sleeve 88 of the synchroniser unit 68. The rear face of the cup additionally carries two diametrically opposite radially directed elongated cam follower lobes 96. The profile of the lobes 96 is more clearly seen in FIG. 12.

The cam arrangement 74 comprises two annular rings 98 and 100 which each include an adjustment arm 102 and a pair of diametrically opposed forwardly projecting cam lobes 104. In the assembled unit the cam ring 100 is rotatably located coaxially in the ring 89 on the hub 94 of the coupling hub 72, as shown in FIG. 11, with the cam lobes bearing on the face of the housing 92 between the cam follower lobes 96.

The purpose of the double cam lobes 104 on each of the cam rings is to enable the dwell contact period between the cam lobes 104 and the cam follower lobes 96 to be made adjustable. For example, when the lobes 104 of the cam rings 98 and 100 overlap each other in a radial direction the dwell time will be dependent on the angular velocity of the shaft 62 and the circumferential length of the overlapped cam lobes. To increase the dwell time the cam ring arms 102 are moved apart as required so that the lobes no longer overlap and the circumferential length of the composite lobes, as seen by the cam followers, increases.

With the angular velocity extraction device assembled as shown in FIG. 12 the output gear 78 is held in position on the shaft 62 by a plate arrangement, not shown, which holds the cam rings 98 and 100 to the output unit 64.

In the assembled extraction device the synchronisation plate 84 of the output unit 64 is biased outwardly, as shown in FIG. 11, the spring 66 biases the synchronisation ring 86 of the synchronisation unit rearwardly away from and clear of the synchronisation plate 84 in the output unit and the spring 70 biases the coupling hub 72 away from the synchronisation unit 68.

As the shaft 54 or 62 is rotated in use, by whatever universal joint set 24 or 30 to which it is attached, the cam followers 96 on the housing of the coupling hub 72 come into contact with the lobes 104 on the relatively stationary cam unit 74, ride onto the lobes and, as the bias of the spring 70 is greater than that of the spring 66, the coupling hub 72 is moved together with the synchroniser unit 68, which is located in it, forwardly towards the output unit 64 until the serrated teeth of the annular synchronisation plates 84 and 86 engage each other.

Should the engagement of the serrated teeth on the two plates result in a complete mesh the teeth on the dog clutch plates 82 and 90 will be synchronised and the forward force being applied to the coupling hub 72 by the cam lobe will now compress the stronger biasing spring of the synchronisation plate 84 to enable the synchronised teeth on the dog clutch plates fully to engage and rotate the output unit for the duration of the cam dwell time. This fractional rotation of the output unit 64, because of the double composite cam lobes and cam followers 96, will occur twice on each revolution of the input shaft 62.

If, however, the engagement of the teeth of the synchronisation plates result in an incomplete mesh, i.e. the sloping ramps of the teeth are engaged and not their radial saw tooth driving faces, the forward motion of the synchronisation unit 68 and the coupling hub 72 will tend to be arrested and the dog clutch teeth will not be synchronised in engaging alignment. The unrelenting forward cam force now overrides the biasing force acting against the back face of the synchronisation unit plate 84 and cause the hub 94 of the coupling hub 72 to be moved forwardly and simultaneously to be twisted in rotation on the helical splines on the hub 88 of the synchronisation unit 68. The angular displacement of this twisted motion is related to the magnitude of the incomplete mesh of the teeth of the plates 84 and 86 and is sufficient to bring the dog clutch teeth into synchronised register for full mating on further advance of the coupling hub 72 to commence the fractional rotation of the output unit 64 and its gear 78.

As the universal joint sets 24 and 30 which drive the angular velocity extraction devices 26 and 32 are rotated in opposite directions by the angular velocity input divider 16 the two extraction devices 32 of the reference stage 20 are mounted between the support plates 56 and 58 in the opposite direction to that of the extraction devices 26 of the non-reference stage of the machine, as shown in FIGS. 7 and 13.

The combined evenly phased pulsed outputs of the three non-reference angular velocity extraction devices 26 are fed, by means of their output gears 78, to the summation gear 28 with which they are engaged with the gear 28 seeing the three combined outputs, for each rotation of the input shaft 12 as an output which is rippled by six pulses, as will be explained below with reference to FIG. 20. Similarly, the pulsed output of the two reference angular velocity extraction devices 32 output gears are combined by the summation gear 34 to produce a four pulse ripple output during each revolution of the extraction devices 32, the pulses of which are in phase and identical with those of the summation gear 28 but of inverted shape because of the different direction of rotation.

Figures 16, 17, 18, 19:
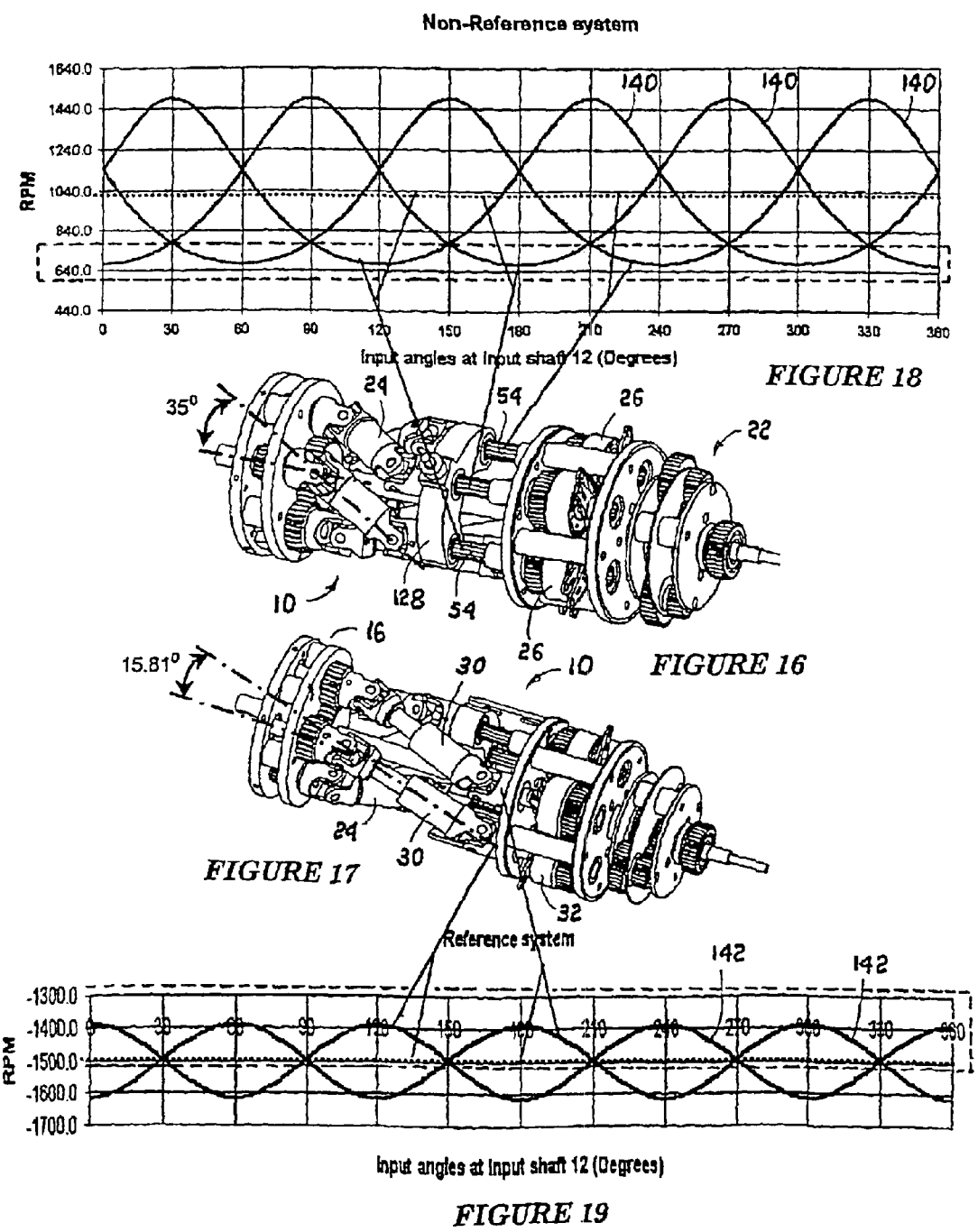
FIG. 16 is a perspective view of the IVT machine of the invention in operation.
FIG. 17 is a perspective view of the machine of FIG. 16 as seen from the other side in FIG. 16.
FIG. 18 is a graph illustrating the angular velocity outputs of the non-reference system universal joint sets of the invention.
FIG. 19 is a graph similar to that of FIG. 18 illustrating the angular velocity outputs of the reference system universal joint sets.

See FIGS. 18 and 19. In no known IVT machine is an attempt made to generate the inverse of the ripple in order to be utilised to cancel the original ripple to obtain a ripple-free output angular velocity.

Figure 14:
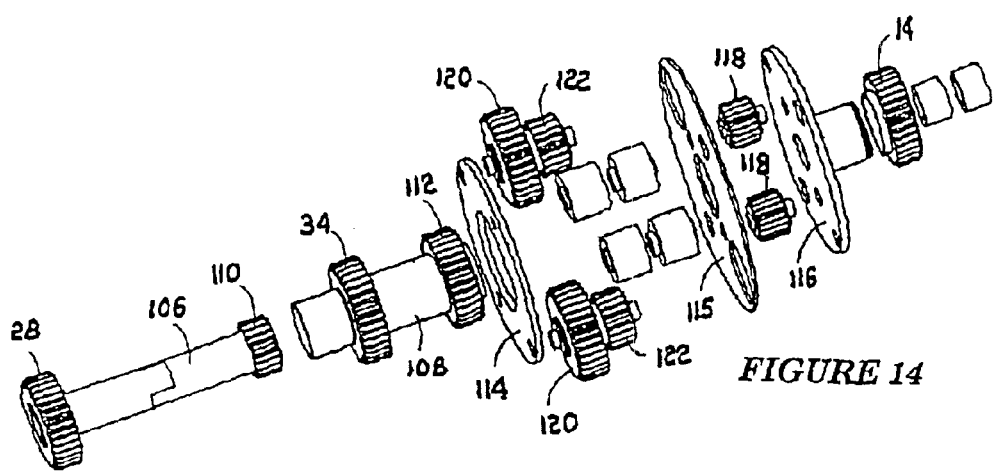
FIG. 14 is an exploded perspective view of the planetary gear output arrangement of the machine.

As shown in FIG. 8, and more clearly in FIG. 14, the summation gears 28 and 34 are mounted on and fixed to tube shafts 106 and 108 respectively. The shaft 106 additionally carries a non-reference sun gear 110 and the shaft 108 a reference sun gear 112. The tube shaft 106 is split to enable the two halves of the shaft to be connected in the shaft 108 with its gears 28 and 110 on the outsides of the tube 108.

As shown in FIG. 8, the concentric tube shafts 106 and 108 pass through the support plate 58 with the planetary sun gears 110 and 112 being situated in the planetary gear output arrangement 22 of the machine.

Figure 15:
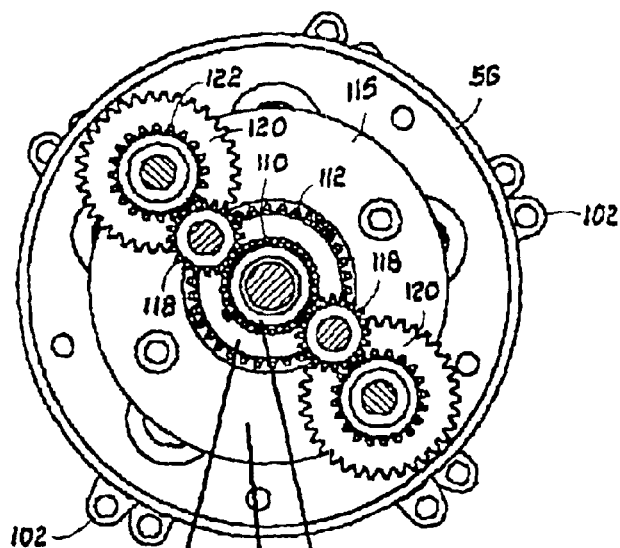
FIG. 15 is an end elevation of the planetary gear arrangement of the machine shown sectioned on the line 15—15 in FIG. 7.

The planetary gear output arrangement 22 is shown in FIGS. 14, 16 and 17 to include three spaced circular cage plates 114, 115 and 116 between which the gears of the arrangement are located for rotation. The cage plate 115 has been omitted from FIGS. 6, 7 and 8 for clarity of illustration. The machine output gear 14 is fixed to and rotated with the cage plate 116. The planetary gear gear arrangement is illustrated in FIGS. 14 and 15 and is shown to include the non-reference sun gear 110, the reference sun gear 112, two reference planet idler gears 118 and two non-reference planet gears 120 and gears 122 which are fixed to and rotate with the gears 120.

The sun gears 110 and 112, as described above, are attached to the tube shafts 106 and 108. The idler gears 118 are meshed with the non-reference sun gear 110 and the gears 122 which are fixed to the reference planet gears 120 which are in turn meshed with the reference sun gear 112. In the rotating planetary system the oppositely phased reference and non-reference angular velocities are combined in the oppositely rotating planet gears which are driven by the gears 110 and 112 effectively to be cancelled and to result on the cage of the planetary system and so the output gear 14 as a linear unrippled output angular velocity.

Figure 21:
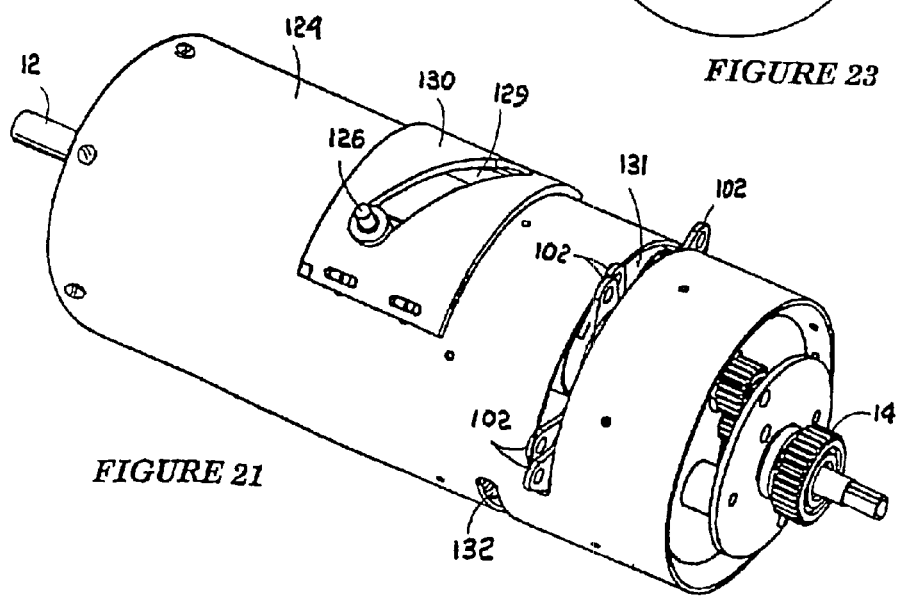
FIG. 21 is a perspective view of the IVT machine of the invention located in its housing.

As shown in FIG. 21 the machine of the invention is located in a cylindrical housing 124 with the input shaft 12 and the output gear 14 projecting from its ends. The support plates of the input angular velocity divider 16 are secured by suitable fasteners to the wall of the housing while the circumferential edges of the support plates 56 and 58 are partially rotatable about the axis of the drive shaft 12 in suitable guide tracks on the inner wall of the housing 124.

The amplitude equalisation of the cyclic angular velocity of the universal joint sets 24 and 30 is controlled by a control pin 126 which is fixed to and projects from an arcuate carrier 128, which is most clearly seen in FIGS. 6, 7 and 16. The splined shafts 54 of the non-reference universal joint sets 24 pass through and are located in suitable bearings in the carrier 128.

The lower end of the control pin 126 is surrounded by a needle bearing which rides in a helical slot 129 in a guide plate 130 which is adjustably fixed to the housing 124 over an opening in its wall.

The free ends of the cam ring adjustment arms 102 of the angular velocity extraction devices 26 and 32 project from the housing through radial slots 131 and 132 respectively, as shown in FIG. 21.

By moving the control pin 126 from the position shown in FIGS. 6, 7 and 8 to the position shown in FIGS. 16 and 21 its direction of movement is controlled by the geometry of the helical slot 129 in the guide plate 130 to cause the carrier 128 attached to it to rotate the entire output unit 35 on the guide tracks in the machine housing which are engaged with the circumferential edges of the plates 56 and 58 of the output unit 35. The rearward helical motion of the pin 126 causes, by means of the carrier 128, the axial length of the universal joint shafts of the non-reference stage 18 universal joint sets 24 to be shortened by drawing their splined output shafts 54 rearwardly to the left through their spline guides in the output unit support plates 56 and 58 while the axial length of the universal joint sets 30 of the reference stage 20 universal joint sets 30 remain constant. This rotary motion of the output unit 35 relatively to the input divider 16, which is fixed to the housing 124, causes the input and output universal joints of all of the universal joint sets 24 and 30 to be moved out of axial register with the shafts attached to them and to continue doing so until their angles θ, as illustrated in FIGS. 16 and 17, are at a maximum as will be the amplitude of their cyclic angular velocity outputs and the upper end of the ratio range of the machine.

The extracted amplitudes of the universal joint sets 24 and 30 of the two groups or stages 18 and 20 are equalized, as rotation of the output unit 35 is commenced, by varying the angles θ of the non-reference universal joint sets 24, independently of the angle created by the rotation of the output unit 35, by shortening the axial length of the universal joint sets 24 in the manner described above.

The control pin 126 may be moved over the length of the slot 129 by means of a suitable servomotor leadscrew arrangement, not shown, which is mounted on the outer surface of the housing 124.

The cam ring arms 102 of the extraction devices 26 and 32 are suitably mechanically or electrically linked to the control pin leadscrew arrangement for concomitant movement of the arms 102 with the control pin 126. This may be achieved by interconnecting one common cam ring arm 102 of each of the extraction devices 26 with its counterpart arms 102 on the remaining two devices 26. The remaining arms 102 on the extraction devices 26 are similarly connected as are the pairs of arms on the extraction devices 32.

Figure 22:
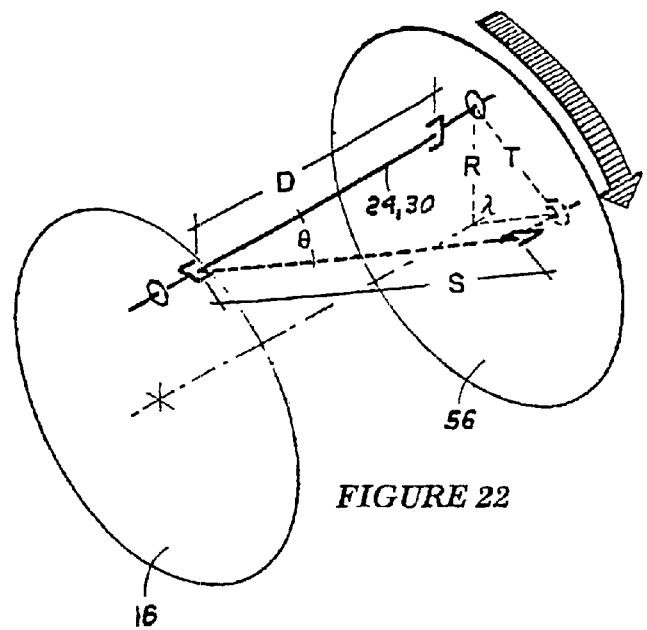
FIG. 22 is a perspective schematic illustration illustrating the operation of a cyclic angular velocity generating device of the invention.

FIG. 22 schematically illustrates, by way of a single example, the angles and degree of movement of the universal joint sets 24 and 30 when the output unit 35 is rotated through an angle λ. θ is the corresponding angle created on a specific universal joint which determines the amplitude of pulsation.

In order to limit the degree of amplitude equalisation which is brought about by movement of the control pin 126 the radius, R, as illustrated in FIG. 22, from the centre of the output unit plate 56, and the axial lengths of the universal joints, D, can be chosen and calculated as such.

As an example based on a prototype of the IVT machine of the invention, let the reference universal joint set 30 of the stage 20 variables be $R_R$, $T_R$, $D_R$ and $\theta_R$ and the non-reference universal joint sets 24 of the stage 18 variables $R_N$, $T_N$, $D_N$ and $\theta_N$. The change in λ is the same for both systems. The following follows from FIG. 22:

$$\sin\left(\frac{\lambda}{2}\right) = \frac{0.5 \cdot T}{R} \qquad \text{A}$$

$$T = 2 \cdot R \cdot \sin\left(\frac{\lambda}{2}\right) \qquad \text{B}$$

If D is kept constant then:

$$\tan(\theta) = \frac{T}{D} \qquad \text{C}$$

$$\text{thus } \theta = \tan^{-1}\left(\frac{2 \cdot R \cdot \sin\left(\frac{\lambda}{2}\right)}{D}\right) \qquad \text{D}$$

$$\text{or } \lambda = 2 \cdot \sin^{-1}\left(\frac{\tan(\theta) \cdot D}{2 \cdot R}\right) \qquad \text{E}$$

If S is kept constant then:

$$\sin(\theta) = \frac{T}{S} \qquad \text{F}$$

$$\text{thus } \theta = \sin^{-1}\left(\frac{2 \cdot R \cdot \sin\left(\frac{\lambda}{2}\right)}{S}\right) \qquad \text{G}$$

Note that the calculation and selection of these values were made according to currently available gears, universal joints and the geometry of the machine control arrangement.

In the prototype of the machine of the invention, the reference stage 20 forward universal joints of the universal joint sets 30 were positioned on a radius $R_R$=45 mm from the center of the plate 56 and the distance between the center point of the cruciform connectors 44 of the universal joints of the universal joint sets 30 was kept constant at $D_R$=160 mm.

For the non-reference system 18 the universal joints of the universal joint sets 24 were positioned on a radius $R_N$=57.2 mm from the center of the plate 56 and the distance between the center point of the connectors 44 of these universal joint sets $D_N$, was varied from 119.2 to 81.8 mm, by way of the helical slot 129 and their extendable splined shafts 54, as λ was varied from 0° to 60°. The geometry of the helical slot 129 was made to ensure that the following relation between the non-reference universal joint sets 24 angle, $\theta_N$, and reference universal joint sets 30 angle, $\theta_R$, is satisfied:

$$\theta_R = 0.000000000889 \cdot \theta_N^6 - 0.0000000838128 \cdot \theta_N^5 + \qquad \text{H}$$
$$0.0000024952888 \cdot \theta_N^4 - 0.0001333623131 \cdot \theta_N^3 +$$
$$0.0003067141224 \cdot \theta_N^2 + 0.576447634634 \cdot \theta_N +$$
$$0.0005433650949$$

Thus while the universal joint sets 30 and 24 of the reference and non-reference systems follow equation H the pulse ripples on their respective absolute minimum extractions will be inverted in shape and equal in amplitude and will therefore cancel each other when combined in the planetary system 22 as will be described with reference to FIG. 20.

When the angles at which the universal joints are operating are changed the ratio changes and the operating plane in which each universal joint set operates changes. This plane shift has an effect on the required length of the composite cam lobes 104 of the extraction devices 26,32 since the duration of extraction should follow the rotation of this plane or phase shift as well as to adjust for the duration.

Figure 23:
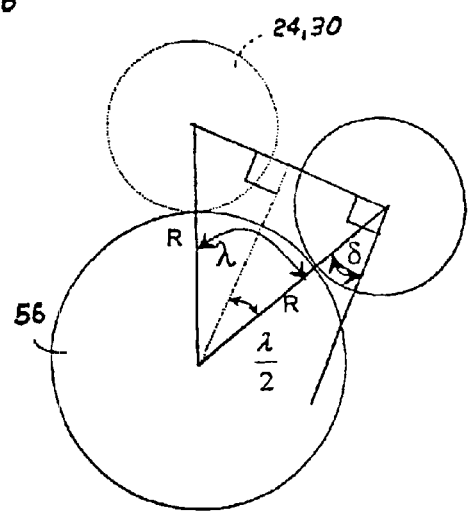
FIG. 23 is a diagrammatic illustration illustrating the phase shift change of the FIG. 22 device in operation.

As illustrated in FIG. 23, the phase shift δ is related to the rotation angle λ in the following way:

$$\delta = \frac{\lambda}{2} \qquad \text{I}$$

To ensure the extraction of the global minimum or maximum, the extraction devices 26 and 32 should follow this plane shift as λ varies from 0° to 60° by adjusting the two cam arms of each of the extraction devices 26 and 32 together without varying their angular relationship. Additionally the cam lobes 104 of each extraction device should also reduce the duration of the extractions as λ varies from 0° to 60° to ensure extraction of the absolute global minimum by the extraction devices and this is done by varying the circumferential length of the lobes 104 by moving the cam arms 102 of the extraction independently of each other.

In operation of the machine, the input shaft 12 is rotated at, for example 1000 rpm, with all of the universal joint sets 24 and 30 operating at an angle of 0°, as shown in FIG. 6, the reference universal joint sets 30 will rotate at 1500 rpm in the opposite direction to that of the input shaft 12 through gears 50 and 51 of the angular velocity input divider 16, while the non-reference universal joint sets 24 will rotate at 1000 rpm in the same direction as the input shaft through the input divider gears 46, 47 and 48. Since all the universal joint sets are operating linearly no cyclic angular velocity effect will be present at the splined output shafts 54 of the three non-reference universal joint sets which will be rotating at 1000 rpm and, as mentioned above, in the same direction as the input shaft. Similarly, there will be no cyclic effect present at the two output shafts 62 of the reference system which will be rotating at 1500 rpm in the direction opposite to the input shaft.

The non-reference angular velocity extraction devices 26 will each extract 60° angular velocity cyclic sections twice for each revolution of the splined shafts 54 which drive them while the three universal joint sets 24 are evenly phased by the fixed gear ratio of gears 46, 47 and 48, in such a way that the minimum angular velocity peak, which, as mentioned above, does not exist when the universal joints are operated at 0°, exists at the centre of the 60° extracted section, as shown in the dotted block in FIG. 18. To accomplish the above extraction positions of the cams 104 of the extraction devices 26, the cams are adjusted by the servomotor leadscrew arrangement through the cam arms 102 to have a duration of 60° while the lobes 96 are following the cams 104. As mentioned above the output of the extraction devices 26 are summed and combined by a summation gear arrangement 28 and transmitted to the planetary sun gear 110 to rotate in the opposite direction to that of the extraction devices 26. The output of the sun gear 110 is illustrated in FIG. 20 by the indicated doffed line 132, in this case 1000 rpm in a direction opposite to that of the input shaft 12.

The reference extraction devices 32 will each extract 90° angular velocity cyclic sections twice for each revolution of the shafts 62 while the two universal joint sets 30 are evenly phased, by the fixed gear ratio of gears 51 and 50 in the input divider 16, in such a way that the minimum angular velocity cyclic peak exists at the centre of the 90° extracted section. To accomplish the above the positions of the cams 104 of the extraction devices 32 are adjusted, as are those of the non-reference system, by the servomotor leadscrew arrangement to have a duration of 90° while the lobes 96 are following the cams 104. The output of the extraction devices 32 are summed by a summation gear arrangement 34 and transmitted to the planetary sun gear 112 to rotate in the opposite direction to that of the extraction devices 32. The output of the sun gear 112 is illustrated in FIG. 20 by the indicated chain line 134, in this case 1500 rpm in the same direction as the input shaft 12.

In the planetary gear output arrangement the sun gear 110 serves as the non-reference input to the planetary gear output arrangement 22 and gear 112 serves as the reference input to the planetary gear output arrangement 22.

The planetary gear arrangement has an e-value of −1, that is when the planetary gear arrangement cage or output 14 is kept fixed then for each revolution of the sun gear 110, the sun gear 112 will rotate one revolution in the opposite direction. This is accomplished through gears 120, 122 and 118. Thus the relation that governs the output 14, gear 110 and gear 112 is, if it is assumed that the direction of the input shaft 12 is positive, as follows:

$$\text{Output 14 angular velocity} = \frac{\text{Angular velocity of gear 110} + \text{Angular velocity of gear 112}}{2} \qquad \text{J}$$

Thus for the above case where the universal joint sets 24 and 30 are all operating at an angle θ of 0°:

$$\text{Output 14 angular velocity} = \frac{-1000 \text{ rpm} + 1500 \text{ rpm}}{2} = 250 \text{ rpm} \qquad \text{K}$$

If the Input shaft 12 continues to rotate at 1000 rpm, with all of the non-reference universal joints 24 operating at an angle of 35°, and the reference universal joints 30, operating at an angle of 15.81°, as illustrated in FIGS. 17 and 16 respectively, the mathematical relationship between the angle of the universal joints of the non-reference system $\theta_N$ and the angle of the universal joints of the Reference system $\theta_R$ follows equation H.

As mentioned above, equation H is a function of the geometry of the universal joint sets 24 and 30 as well as a function of the geometry of the radial slot 129 in the guide plate 130 which determines the axial length of the non-reference universal joints sets 24 as all of the components which are carried by the output unit 35, are rotated within the housing 124.

Figure 20:
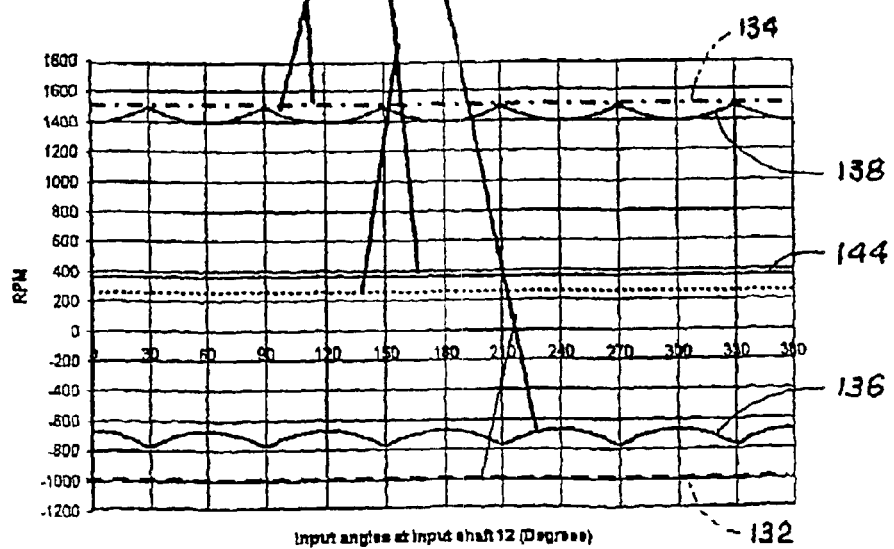
FIG. 20 is a graph illustrating the summed extraction device outputs as fed to the planetary gear arrangement and the planetary gear output of the machine of the invention.

The above function ensures that the extracted minimum pulsating angular velocity 136 of the non-reference system at the planetary sun gear 110 and the extracted absolute minimum pulsating angular velocity 138 of the reference system at the sun gear 112 have exactly equal amplitudes and inverted curves of pulsation, as illustrated in FIG. 20.

The equation governing the pulsation output angular velocity of the non-reference 24 and reference 30 stages at 54 and 62 respectively is as follows:

$$\omega_{Output}(\alpha_1) = \frac{\cos(\theta)^2 \cdot \omega_{Input}}{\cos^2(\alpha_1) + \cos(\theta)^4 \cdot \sin^2(\alpha_1)} \qquad \text{L}$$

Where
$\omega_{Output}$=Output angular velocity of the respective stage
$\omega_{Input}$=Input angular velocity of the respective stage
$\alpha_1$=Input angular position of the respective stage
θ=Operation angle of the universal joint sets of the respective stage.

For $\theta=0°$, $\omega_{output}=\omega_{Input}$ as discussed described above where all of the universal joint sets operate at 0° angles.

The angular velocity input to the non-reference universal joint sets at 24 from the input divider 16 will cause the universal joint sets to rotate at 1000 rpm in the same direction as the input shaft 12. The output of these non-reference universal joint sets at the splined shafts 54 will follow equation L and rotate in the direction of the input shaft 12 with each producing an angular pulsating velocity 140 as illustrated in FIG. 18.

Since the non-reference extraction devices 26 are extracting the minimum (slowest) part of the angular velocity pulsations at 54, the duration of extraction $\phi_N$, will decrease from 60° to 42.35° as $\theta_N$ increases from 0° to 35°. The equation governing this relationship is as follows:

$$\phi_R=\tan^{-1}(\cos(\theta_N)^2 \cdot \tan(150°))-\tan^{-1}(\cos(\theta_N)^2 \cdot \tan(210°)) \quad M$$

Where the 150° and 210° refer to the angles measured at the input shaft 12.

Thus the non-reference extraction devices 26 will each extract 42.35° angular velocity cyclic sections twice for each revolution of 54 while the three universal joint sets 24 are evenly phased, by the fixed gear ratio of gears 46, 47 and 48, in such a way that the minimum angular velocity peak exists at the centre of the 42.35° extracted section. To accomplish this the positions of the cams 104 of extraction devices 26 by means of their arms 102 are adjusted by the servomotor leadscrew to have a duration of 42.35° while following a lobe 96. The output of the extraction devices 26 are summed by the summation gear arrangement 28 and transmitted to the planetary sun gear 110 to rotate in the opposite direction to that of the extraction devices 26. The output of the sun gear 110 is illustrated in FIG. 20 by the indicated pulse line 136, in a direction opposite to the input shaft 12.

The gear 50 input to the reference universal joint sets 30 will rotate the universal joint sets at 1500 rpm in the opposite direction to the input shaft 12. The output of the reference universal joint sets at 60 will follow equation L and rotate in a direction opposite to the input shaft 12 with an angular pulsating velocity 142, as illustrated in FIG. 19.

Since the reference extraction devices 32 are extracting the minimum (slowest) part of the angular velocity pulsations on the drive shafts 62 of the extraction devices, the duration of extraction $\phi_R$, will decrease from 90° to 85.63° as $\theta_R$ increases from 0° to 15.81°. The equation governing the above is as follows:

$$\phi=\tan^{-1}(\cos(\theta_R)^2 \cdot \tan(-1.5 \cdot 30°))-\tan^{-1}(\cos(\theta_R)^2 \cdot \tan(-1.5 \cdot 90°)) \quad K$$

Where the $-1.5 \cdot 30°=-45°$ and $-1.5 \cdot 90°=-135°$ refer to the angles measured at the input shaft 12.

Thus the reference extraction devices 32 will each extract 85.63° sections twice for each revolution of the extraction drive shafts 60 while the two universal joint sets 30 are evenly phased, by the fixed gear ratio of the input divider 16 gears 51 and 50, in such a way that the minimum angular velocity peak exists at the centre of the 85.63° extracted section. To accomplish this the positions of the cams 104 of the extraction devices 32 are adjusted by the servomotor leadscrew arrangement to have a duration of 85.63° while the extraction device lobes 96 are following the cam lobes 104. The output of the extraction devices 32 are summed by the summation gear arrangement 34 and transmitted to sun gear 112 to rotate the gear in the opposite direction to that of the extraction devices 34. The output of sun gear 112 is illustrated in FIG. 20 by pulse line 138, in this case an angular pulsating velocity around 1500 rpm in the direction of the input shaft 12.

The planetary sun gear 110 serves as the non-reference input and the sun gear 112 as the reference input to the planetary gear output arrangement 22. The planetary gear arrangement, as described above, cancels the relatively inverted, identically shaped and sized outputs of the gears 110 and 112 to result in the unpulsed linear output at the output member 14 as illustrated by the solid line 144 in FIG. 20.

Thus for the above case the output is illustrated by the indicated constant angular velocity 144 of 360.64 rpm in FIG. 20 as calculated by equation J.

For the above specific machine using universal joints having a maximum displacement angle $\theta=35°$ an output range of 250 rpm to 360.64 rpm for an input of 1000 rpm is available or alternatively an increase of $$\frac{360.64-250}{250} \times 100\% = 44.25\%$$

over the lower end. If, however, 45° displacement universal joints are used the ratio change is increased to 76%.

The torque in the system is obviously inversely proportional to the angular velocity ratio over a particular component or series of components. Because of the e value of the planetary system of $-1$, the torque at the output 14 is the sum of the torque on the summation gears 28 and 34 while the torque imposed on the gears 28 and 34 is equal.

Figure 24:
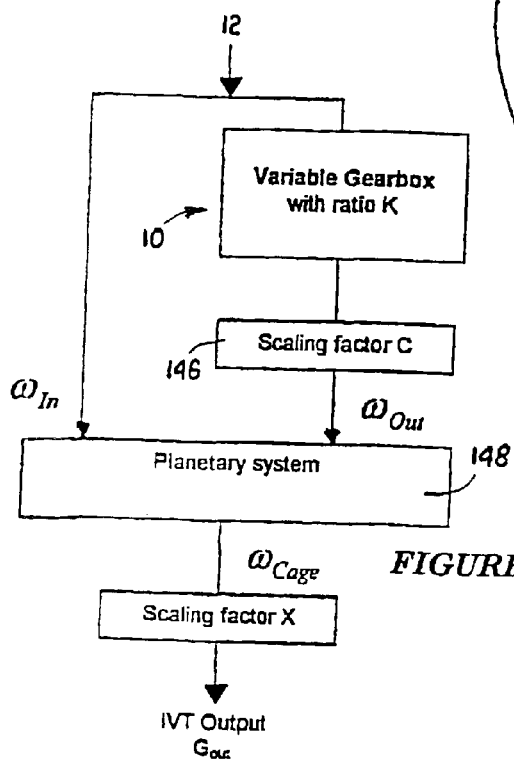
FIG. 24 is a block diagram of the extended operational capability of the IVT machine of the invention.

To vary the ratio range of the IVT, which is described above the variable gearbox 10 of invention with a ratio K in FIG. 24 could be made to include a fixed ratio gear arrangement 146 having a scaling factor C and the input 12, $G_{in}$ could be divided between a direct feed to a planetary system 148 to be combined with the gearbox 10 output, with the output of the planetary system 148 then being multiplied by a fixed gear ratio arrangement having a scaling factor of X to provide the IVT output $G_{out}$.

A typical equation governing the system in FIG. 24 is given in equation K below:

$$G_{out}=0.5 \cdot X \cdot G_{in}(1-K \cdot C) \quad O$$

From equation O it can be seen that the neutral point, where the IVT output is zero, is reached when $K \cdot C=1$. By calculating the scaling factors C and X for a specific variable gearbox with ratio K, the desired ranges (forward and reverse) for the IVT can be set. For example if C=3.33 and K may vary from 0.25 to 0.36 the following is true:

If $K = 0.3$ then $G_{out} = 0.5 \cdot X \cdot G_{in}(1 - 0.3 \cdot 33)$
$= 0$

Thus the output is locked and zero.

If $K = 0.25$ then $G_{out} = 0.5 \cdot \times \cdot G_{in}(1 - 0.25 \cdot 3.33)$
$= 0.084 \cdot \times \cdot G_{in}$ Thus the direction of rotation $G_{out}$ is forward.

If $K = 0.36$ then $G_{out} = 0.5 \cdot \times \cdot G_{in}(1 - 0.36 \cdot 3.33)$
$= -0.1 \cdot \times \cdot G_{in}$ Therefore the direction of rotation of $G_{out}$ is reversed.

X can be any fixed gear ratio while $G_{in}$ may be any angular velocity input.

The IVT machine of the invention finds particular application in:

automobiles: This system would function very well to keep the engine at optimum performance since the exact required gear ratio and direction can be selected to optimise fuel consumption or power output.

earth moving equipment: Direction changing clutch systems are eliminated.

other applications, traditionally utilising variable speed electrical motors and servomotors, the described system can run off a constant velocity source, operating at optimum performance, thus providing a more efficient system.

The described system also features a theoretical torque of infinity as K is varied around the zero point.

The invention is not limited to the precise details as herein described with reference to the drawings. For example, the pulse extraction devices 26 and 32 could be replaced by equivalent devices having smooth faced metal clutch plates and means for electrically magnetising at least one of the plates to magnetically attract and couple with the other plate and an electrical switch arrangement, for replacing the cams 104 and cam followers 96, which is operated by the output shafts of the universal joint sets with which they are engaged.

What is claimed is:

1. An infinitely variable transmission comprising an angular velocity input member [12], an angular velocity output member [14], two parallel stages [18, 20] of cyclic angular velocity generating devices [24, 30], a drive arrangement [16] for applying angular velocity from the input member [12] to each of the angular velocity generating devices [24, 30], extraction devices [26, 32] which are each driven by a cyclic angular velocity generating device [24, 30] in each of the two stages [18, 20] which extracts the absolute maximum angular velocity pulsations from the cyclic angular velocity output of the cyclic angular velocity generating device [24, 30] which drives it, means for varying the amplitude of the cyclic angular velocity produced by at least one of the stages [18, 20], an arrangement [28, 34, 22] for summing and combining the pulsating angular velocity outputs from the extraction devices [26, 32] and applying a single non-pulsating output angular velocity to the output member [14], characterised in that:

each of the cyclic angular velocity generating devices [24,30] includes two shafts which are coupled to each other by at least one universal joint, the drive means [16] includes a drive arrangement for driving the cyclic angular velocity generating devices [24,30] in each of the stages [18,20] in such a direction and fixed ratio of rotation relatively to the direction of rotation of the input member [12] so that each stage [18,20] produces the same number of angular velocity cycles per revolution of the input member [12], the amplitude varying means [126,128] is a control arrangement which interconnects one of the shafts of each of the cyclic angular velocity generating devices [24,30] in each of the stages [18,20] to those in the other stage [18,20] to enable the connected shafts in each stage to be concomitantly moved by the control arrangement in a predetermined angular relationship relatively to the connected shafts in the other stage [18,20] to enable the amplitudes of the cyclic angular velocities generated by the cyclic angular velocity generating devices [24,30] in that stage to be varied to correspond to the angular velocity amplitudes in the remaining stage [18,20], and means which is activated by the control arrangement for controlling the duration of each of the extract on device pulsations from at least one stage [18,20] in a predetermined relationship to the amplitudes of the cyclic angular velocities generated by the cyclic angular velocity generating devices [24,30], wherein the angular velocity generating stage [18] includes at least three cyclic angular velocity generating devices [24] and the angular velocity generating stage [20] two cyclic angular velocity generating devices [30].

2. An infinitely variable transmission as claimed in claim 1 wherein the angular velocity generating devices in each stage [24,30] are rotationally phased 60° apart with reference to the input member [12].

3. An infinitely variable transmission as claimed in claim 2, wherein the stage [18] universal joint sets are rotated by the drive means [16] in a ratio of 1:1 relatively to and in the same direction of rotation as the input member [12] and the universal joint sets of the stage [20] are rotated in a ratio of 1:1.5 relatively to and in a direction opposite to the direction of rotation of the input member [12].

4. An infinitely variable transmission as claimed in claim 2 wherein the angular velocity generating devices are each a universal joint set [24 30] which includes a universal shaft which carries at each of its ends a universal joint with one of the universal joints being driven by the drive means [16] with the other connected by a shaft [54, 62] to an extraction device [26, 32].

5. An infinitely variable transmission as claimed in claim 4 wherein the universal shaft of each universal joint set [24, 30] is telescopically variable in length.

6. An infinitely variable transmission as claimed in claim 4 wherein the yokes of the universal joints of the universal joint sets [24, 30] which are attached to the universal shaft are fixed in each set at 90° to each other.

7. An infinitely variable transmission as claimed in claim 6 wherein the components of the drive arrangement [16] are located between and on two circular plates and the components of the transmission are located in a cylindrical housing [124] with the plates of the drive means [16] fixed to the housing wall with the remainder of the components being at least partially rotatable about the housing axis to vary the output amplitudes of the cyclic angular velocities of the universal joint sets [24, 30] by varying the angular disposition of the universal shafts of the universal joint set [24, 30] relatively to their universal joints.

8. An infinitely variable transmission as claimed in claim 7 wherein the extraction devices [26, 32] are rotatably mounted between two circular plates [56, 58] with the shafts [54] of the universal joint sets [24] passing slidably through the plates [56, 58] and the extraction devices [26] between them.

9. An infinitely variable transmission as claimed in claim 7 wherein the plate [56, 58] are each rotatably mounted coaxially in the housing [124] on a guide track on the inner wall of the housing [124].

10. An infinitely variable transmission comprising an angular velocity input member [12], an angular velocity output member [14], two parallel stages [18, 20] of cyclic angular velocity generating devices [24, 30], a drive arrangement [16] for applying angular velocity from the input member [12] to each of the angular velocity generating devices [24, 30], extraction devices [26, 32] which are each driven by a cyclic angular velocity generating device [24, 30] in each of the two stages [18, 20] which extracts the absolute maximum angular velocity pulsations from the cyclic angular velocity output of the cyclic angular velocity generating device [24, 30] which drives it, means for varying the amplitude of the cyclic angular velocity produced by at least one of the stages [18, 20], an arrangement [28, 34, 22] for summing an combining the pulsating angular velocity outputs from the extraction devices [26, 32] and applying a single non-pulsating output angular velocity to the output member [14], characterised in that:

each of the cyclic angular velocity generating devices [24,30] includes two shafts which are coupled to each other by at least one universal joint, the drive means [16] includes a drive arrangement for driving the cyclic angular velocity generating devices [24,30] in each of the stages [18,20] in such a direction and fixed ratio of rotation relatively to the direction of rotation of the input member [12] so that each stage [18,20] produces the same number of angular velocity cycles per revolution of the input member [12], the amplitude varying means [126,128] is a control arrangement which interconnects one of the shafts of each of the cyclic angular velocity generating devices [24,30] in each of the stages [18,20] to those in the other stage [18,20] to enable the connected shafts in each stage to be concomitantly moved by the control arrangement in a predetermined angular relationship relatively to the connected shafts in the other stage [18,20] to enable the amplitudes of the cyclic angular velocities generated by the cyclic angular velocity generating devices [24,30] in that stage to be varied to correspond to the angular velocity amplitudes in the remaining stage [18,20], and means which is activated by the control arrangement for controlling the duration of each of the extraction device pulsations from at least one stage [18,20] in a predetermined relationship to the amplitudes of the cyclic angular velocities generated by the cyclic angular velocity generating devices [24,30], wherein the extraction devices [26, 32] each include a boss [88] with which a shaft [54, 62] of a universal joint set [24, 30] is engaged, opposed clutch plates [82, 90] with one of the clutch plates [90] being engaged with the boss [88] and the other with an output gear [78] with both clutch places being movable relatively to each other in the axial direction of the shafts [54, 62] between a first position in which they are spaced from each other and a second position in which they are engaged with each other and means for causing movement of the clutch plates between their two positions of movement, in dependence on the angular position of rotation of the shafts [54 62] with which they are engaged, twice during each revolution of the shafts [54, 62] and for adjustably varying the time period of engagement of the plates [82, 90] to cause their output gear [78] to partially rotate twice during each cycle of rotation of the drive shafts [54, 62] and so to extract an output gear [78] movement pulse from the global absolute maximum and minimum portions of each cycle of rotation of the drive shaft [54, 62].

11. An infinitely variable transmission as claimed in claim 10 wherein the clutch plate [82, 90] movement causing means is a double lobed [104] cam arrangement [74] and two cam followers [96] which are carried by the extraction device boss [88] and the extraction device includes biasing means biasing the cam followers [96] onto the cam arrangement [74].

12. An infinitely variable transmission as claimed in claim 11 wherein the cam arrangement [74] includes two annular rings [89, 100] with one concentrically located within the other to be relatively rotatable about and clear of the shaft [54, 62], two diametrically opposite raised cam lobes [104] which extend over a predetermined limited portion of the circumferential length of and project outwardly from the annular face of each of the rings on a common side of the rings [98, 100], and a control arm [102] which project partially outwardly from at least one of the rings [98, 100] form rotating the ring and the lobes [104] on it from a position in which both lobes [104] on the rings [98, 100] overlap and are in radial register to a position in which the two pairs of lobe partially overlap each other to increase the circumferential length of the composite lobes.

13. An infinitely variable transmission as claimed in claim 10 wherein the clutch plates [82, 90] are dog-tooth clutch plates and the extraction devices each include two synchronisation ring plate [84, 86] with plates [84, 86] each being associated with one of the clutch plates [82, 90] and each synchronisation plate [84, 86] includes a ring of radial teeth which face and mesh with those on the opposite synchronisation plate [84, 86] with the synchronisation plates [84, 86] being movable relatively to their associated clutch plates [82, 90] towards and away from the remaining synchronisation plate [84, 86] and means biasing the synchronisation plates [84, 86] away from the faces of the clutch plates [82, 90] so that when the clutch plates are moved towards each other the teeth on the synchronisation plates [84 86] first engage each other and, if necessary, fractionally rotate relatively to the other to ensure a clean mesh of the dog-teeth on the clutch plates [82, 90] when brought into engagement.

14. An infinitely variable transmission as claimed in claim 10 wherein the clutch plates [82, 90] are smooth faced metal plates and the extraction devices [26, 32] each include means for electrically magnetising at least one of the plates [82, 90] to cause the plates [82, 90] to become magnetically coupled, and electrical switch means which is synchronised with the shaft [54, 62] for switching electrical current to the clutch plate [82, 90] magnetising mean twice for every revolution of the shaft [54, 62] for predetermined time periods during each revolution of the shaft [54, 62].

15. An infinitely variable transmission as claimed in claim 10 wherein the clutch plate [82, 90] movement causing means is an electrical device for moving at least one of the plates towards the other to become coupled and electrical switch means which is synchronised with the shaft [54, 62] for switching electrical current to the clutch plate [82, 90] moving means twice in predetermined time periods during each revolution of the shaft [54, 62].

16. An infinitely variable transmission comprising
an angular velocity input member [12],
an angular velocity output member [14],
two parallel stages [18, 20] of cyclic angular velocity generating devices [24, 30],
a drive arrangement [16] for applying angular velocity from the input member [12] to each of the angular velocity generating devices [24, 30],
extraction devices [26, 32] which are each driven by a cyclic angular velocity generating device [24, 30] in each of the two stages [18, 20] which extracts the absolute maximum angular velocity pulsations from the cyclic angular velocity output of the cyclic angular velocity generating device [24, 30] which drives it, means for varying the amplitude of the cyclic angular velocity produced by at least one of the stages [18, 20], an arrangement [28, 34, 22] for summing and combining the pulsating angular velocity outputs from the extraction devices [26, 32] and applying a single non-pulsating output angular velocity to the output member [14], characterised in that:

each of the cyclic angular velocity generating devices [24,30] includes two shafts which are coupled to each other by at least one universal joint, the drive means [16] includes a drive arrangement for driving the cyclic angular velocity generating devices [24,30] in each of the stages [18,20] in such a direction and fixed ratio of rotation relatively to the direction of rotation of the input member [12] so that each stage [18,20] produces the same number of angular velocity cycles per revolution of the input member [12], the amplitude varying means [126,128] is a control arrangement which interconnects one of the shafts of each of the cyclic angular velocity generating devices [24,30] in each of the stages [18,20] to those in the other stage [18,20] to enable the connected shafts in each stage to be concomitantly moved by the control arrangement in a predetermined angular relationship relatively to the connected shafts in the other stage [18,20] to enable the amplitudes of the cyclic angular velocities generated by the cyclic angular velocity generating devices [24,30] in that stage to be varied to correspond to the angular velocity amplitudes in the remaining stage [18,20], and means which is activated by the control arrangement for controlling the duration of each of the extraction device pulsations from at least one stage [18,20] in a predetermined relationship to the amplitudes of the cyclic angular velocities generated by the cyclic angular velocity generating devices [24,30], wherein the cyclic angular velocity amplitude adjusting means includes a carrier [128] which is engaged with the shafts [54] of the universal joint sets [24] with the carrier [128] including a radially extending control pin [126] and the housing wall a helical guide slot through which the pin [126] projects to be movable from one end of the slot, at which the components of the universal joint sets [24, 30] are in axial alignment and the angular velocity of the universal joint sets [24, 30] is non-cyclic at the low end of the transmission ratio range, to the other end of the slot at which the carrier [128] has rotated the plates [82, 90] to the maximum position of angular displacement of the universal shafts of the universal joint sets [24, 30] to achieve maximum cyclic angular velocity output amplitude at the high end of the transmission ratio range.

17. An infinitely variable transmission as claimed in claim 16 including a circumferential slot in the housing [142] wall through which the ends of the cam arms [102] of the extraction device [26, 32] project and a suitable control arrangement on the outside of the housing [124] for moving the control pin [126] in its slot and causing concomitant movement of the cam arms [102] to vary the amplitude of the pulsed output angular velocities of the extraction devices [26, 32] to compensate for cyclic angular velocity amplitude changes of the universal joints [24, 30] as the control pin [126] is moved.

* * * * *